United States Patent [19]
Ekchian et al.

[11] Patent Number: 5,535,303
[45] Date of Patent: Jul. 9, 1996

[54] "BAROMETER" NEURON FOR A NEURAL NETWORK

[75] Inventors: Leon K. Ekchian, Northridge; David D. Johnson, Simi Valley; William F. Smith, Los Angeles, all of Calif.

[73] Assignee: Litton Systems, Inc., Woodland Hills, Calif.

[21] Appl. No.: 202,708

[22] Filed: Feb. 22, 1994

Related U.S. Application Data

[63] Continuation of Ser. No. 844,217, Mar. 2, 1992, abandoned, which is a continuation-in-part of Ser. No. 509,174, Apr. 16, 1990, abandoned.

[51] Int. Cl.$^6$ .................................................. G06G 7/12
[52] U.S. Cl. ........................ 395/24; 395/21; 395/22; 395/23
[58] Field of Search .............................. 395/21, 22, 23, 395/24

[56] References Cited

U.S. PATENT DOCUMENTS 4,930,099  5/1990  Castelaz ................................. 364/807

OTHER PUBLICATIONS

Foo et al, "Integral Linear Programming Neural Networks for Job–Shop Scheduling", IEEE Int–Conf–on Neural Networks, Jul. 1988.

Foo et al "Stochastic Neural Networks for solving Job–Shop Scheduling: Part–Represention," IEEE Int–Conf–on Neural Networks, Jul. 1988.

Hopfield et al, "Neural Computing with Neural Circuits: A Model",

Aug. 1986.

Hopfield etal. ,"Neural Computing of Decision in Optimization Problems", Biol. Cybern. 52, 141–152, 1985.

*Primary Examiner*—George B. Davis
*Attorney, Agent, or Firm*—D. J. Ellingsberg

[57] ABSTRACT

A "Barometer" Neuron enhances stability in a Neural Network System that, when used as a track-while-scan system, assigns sensor plots to predicted track positions in a plot/track association situation. The "Barometer" Neuron functions as a bench-mark or reference system node that equates a superimposed plot and track to a zero distance as a "perfect" pairing of plot and track which has a measured/desired level of inhibition. The "Barometer" Neuron responds to the System inputs, compares these inputs against the level of inhibition of the "perfect" pair, and generates a supplied excitation or inhibition output signal to the System which adjusts the System to a desired value at or near 1.0; this the reference level of inhibition of the "perfect" pair.

2 Claims, 7 Drawing Sheets

"BAROMETER" NEURON FOR A NEURAL NETWORK

This application is a continuation of application Ser. No. 07/844,217 filed Mar. 2, 1992, now abandoned which is a continuation-in-part of application Ser. No. 07/509,174 filed Apr. 16, 1990, now abandoned.

BACKGROUND OF THE INVENTION

1. Field of the Invention

A neural network system having a "barometer" neuron to enhance system stability which improves surveillance capabilities, particularly when the system is used in a track-while-scan operation.

Track-while-scan systems have as an important feature plot/track association which consists of assigning radar plots to predicted track positions. Applying neural network technology to the plot/track association problem in accordance with the invention achieves good global solutions for track-while-scan systems.

However, neural networks have recurring instability problems.

2. Description of Related Art

A neural network implementation of plot/track association consists of assigning radar plots to predicted track positions and is an important feature of all track-while-scan systems. Plot to track association is the middle step in a track while scan (TWS) cycle. The cycle begins by correlating plots generated by the radar with predicted track positions, producing potential parings. Next, in the association step, potential pairings are compared to produce some set of "best" associations. Each track's associated plot is then used to update the track's parameters and predict the track's position in the next cycle.

The problem is complicated in regions of high target density because many conflicting associations are possible. Also, the blip/scan ratio, i.e., the ratio of the number of scans in which a return is received for a given track to the total number of scans, is always less than one. This means that not all tracks should be assigned an associated plot.

Association can be viewed as an example of the classical assignment problem. The optimal solution to an assignment problem minimizes some cost function, in this case a total distance which is the sum of all of the individual plot/track distances. Frequently, the globally optimal solution contains pairings which are not necessarily between nearest neighbors. An array of techniques has been propounded to solve assignment problems, including the Munkres algorithm, the Ford-Fulkerson method, and the Hungarian method, which are all more efficient than an exhaustive search of the possible solutions.

Correct association is vital to tracking. Incorrect associations over subsequent scans can lead to filter divergence and eventual loss of track continuity.

Neural networks are information processing systems made up of (large) numbers of simple processors which are extensively interconnected. Neural networks are attempts at processing architectures similar to naturally occurring, biological ones, which solve problems that have not yielded to traditional computer methods and architectures. The name "neural network" derives from the biological "neuron," which is what each simple processor is called.

A frequently used model of such a processor and the processor used in the networks of the invention is shown by FIG. 1.

In the processor of FIG. 1, each neuron has a large group of inputs taken directly from the outputs of other neurons $V_j(k)$. Associated with each input line there is a connection weight $T_{nj}$. This weight describes the relative contribution of the line's input in computing the neuron's next state. A zero weight indicates that there is effectively no contribution. A negative weight value indicates an inhibitory relationship. A positive weight shows an excitatory relationship.

A single neuron's operation is relatively simple. At cycle k+1, it scans all of its inputs (which are the outputs of the other neurons at cycle k), multiplies each input by the weight associated with that input, forming $V_j T_{nj}$, and sums these products. Then, the weighted sum is passed through a "transfer" function to form the neuron's output for cycle k+1, $V_n(k+1)$.

A variety of transfer functions are used, but a common one is the sigmoid function, which is defined as:

$$\text{Sigmoid}(x) = \frac{1}{(1+e^{-x})}$$

where x is the sum of the weighted inputs.

There are many ways in which neurons are connected and in which computations are ordered within networks. Nearly all, however, have in common that the network's "knowledge" or "expertise" is distributed over the entire network and actually resides in the connection weights. As long as the weights are equal, the network is "symmetric" and seeks a stable equilibrium.

Some of the best documented results using neural networks to solve problems describe the use of nets to solve the Travelling Salesman Problem (TSP). [J. J. Hopfield and D. W. Tank paper: "Neural" Computation of Decisions in Optimization Problems. Biol. Cybern. 52, 141–152 (1985); hereinafter "Hopfield TSP"]

These results using neural networks are applicable to modern air defense systems which must become more and more sophisticated to handle increasingly complex projected threats, such as low-observable (LO) targets and potentially massive raid situations. In order to detect LO targets, sensor sensitivity must be greatly increased (resulting in significantly more false alarms) or the suite of sensors must be augmented to include a variety of sensors, such as infrared radiation (IR) or electronic support measures (ESM), and then fuse their respective information. In either case, it becomes necessary to process significantly more and more data.

Conventional signal processing techniques are ill-equipped to handle extremely dense situations and very low signal-to-noise ratio (SNR) conditions. Neural-networks when applied to detection and tracking technology could make a significant performance improvement in plot/track association.

What is plot/track association? Plot/track association consists of assigning radar plots to predicted track positions. It is a critical but computationally intensive element of track-while-scan (TWS) systems. Incorrect associations over consecutive scans can lead to filter divergence and eventual loss of track continuity.

In benign conditions with sparse spatial density of targets and false plots, a nearest neighbor assignment protocol is often satisfactory. However, as the density increases and exceeds on the average 1.2 returns per correlation gate, the misassociation errors using a nearest neighbor assignment become prohibitive. This can occur as the number of plots increases or as the size of the correlation gate increases. The latter was found to be the case in tracking with a bistatic radar, where the correlation gates tend to be significantly larger as a result of larger measurement errors.

To exploit the massive, computational processing capability of neural networks, the plot/track association problem can be formulated in a basic framework very similar to that of the classic Travelling Salesman Problem (TSP).

The TSP can be defined as follows: given a number of cities to visit, what is the shortest circuit of all the cities, visiting each one once and then returning to the original city, that a salesman could take? The problem is NP-complete, meaning that it is of the class of problems whose exact solution becomes intractable when the problem grows large. For example in a 10 city TSP there are about 181,000 different tours to check, while for a 20 city TSP there are about $6.08 \times 10^{16}$ tours to check!

If rows in the Hopfield TSP neural network are allowed to represent plots instead of cities and columns represent tracks instead of positions, then the network is well-suited for the plot/track association problem. Thus, each possible plot/track pairing is assigned a dedicated neuron. FIG. 2 illustrates the similarities between the PRIOR ART TSP and the problem of plot/track association.

In view of Hopfield's teachings, the solution to the plot/track association problem can be interpreted in a similar way: there should be exactly one cell "on" per row (one association per plot) and one "on" per column (one association per track). The network's solution state should have a number of cells "on" corresponding to the minimum of these two counts if they are not equal.

A distance measurement is also being minimized for this plot/track association problem: the essential difference is that distance is measured from track-to-plot rather than city-to-city. The optimal solution to the association problem produces that set of assignments which, taken all together, minimize the sum of all of the distances from each plot to the predicted position of the track to which it is assigned.

Track-to-plot association then is the final step in a track-while-scan (TWS) cycle. The TWS cycle begins by predicting each track's position. Plots generated by the radar hardware (and preprocessing software) are then correlated against the predicted track positions and a correlation score is developed by each potential pairing. Finally, in the association step, correlation scores are compared to produce some set of "best" associations. Each track's associated plot is then used to update the track's parameters for prediction in the next cycle.

The problem is complicated in regions of high target density because many conflicting associations are possible. Also, the blip/scan ratio (the ratio of the number of scans in which a return is received for a given track to the total number of scans) is always less than 1.0, meaning that not all tracks will be assigned an associated plot.

To represent this plot/track association problem then as applied, for example to a modern air defense system, interconnection weights are computed somewhat differently than in Hopfield's TSP network. The weight equation for the computation of the connection weights $^TX_{Xi}Y_j$ becomes (with X and Y as plots, i and j as tracks, and $d_{Xi}$ as the distance from plot X to track i):

$$T_{Xi,Yj} = -A\delta_{XY}(1-\delta_{ij}) \quad (1)$$
$$-B\delta_{ij}(1-\delta_{XY})$$
$$-C$$
$$-D(1-\delta_{ij})(1-\delta_{XY})(d_{Xi}+d_{Yj})$$

where −A coefficient represents the inhibition between cells in a row, the −B coefficient represents the inhibition between cells in a column, and the −C coefficient represents the inhibition between the global or network of cells which are "on".

The external bias equation is:

$$I_{Xi} = +Cn \quad (1)$$

and remains unchanged from Hopfield's energy equation. (See Prof. J. J. Hopfield and D. W. Tank's paper, supra).

The coefficients −A, −B, and −C are also unchanged from Hopfield's equation. However, the −D coefficient in equation (1) does differ from the −D coefficient in Hopfield's equation.

In the Hopfield TSP, when two cells in adjoining columns are "on", then the distance between the two cities in whose rows the cells lie is part of the total distance of the tour. In the plot/track association network, when any two cells (not in the same row or column) are "on", then a distance proportional to the sum of the two plot/track distances is added to the global solution. The actual distance added is:

$$\frac{d_{Xi}+d_{Yj}}{2(n-1)} \quad (3)$$

This $2(n-1)$ factor takes into account that for any neuron which has value 1, in the solution there will be $(n-1)$ other neurons also of value 1, and the −D coefficient will be added in $2(n-1)$ times for each neuron because of the double summation of the neuron values weighted products. Since the D term is a constant coefficient multiplied into the distance, the $(n-1)$ factor can be incorporated into D. The value actually substituted into the weight equation (1) for $(d_{Xi}+d_{Yj})$ is:

$$\frac{d_{Xi}+d_{Yj}}{2 \text{ (Maximum plot/track distance)}} \quad (3.1)$$

In the solution of the Hopfield TSP, an additional parameter, $u_o$, is added and another, n, is redefined. The parameter n, originally representing the number of cities (and the desired number of cells "on"), "was used to adjust the neutral position of the amplifiers which would otherwise also need an adjustable offset parameter in their gain functions." (See Hopfield and Tank, id.) The n parameter appears in Hopfield's energy equation and also in equation (2) above; it basically functions to define the amount of external excitation the network is given. The $U_o$ parameter is used as a gain in the modified sigmoid function:

$$\text{Sigmoid}(x) = \frac{1}{(1+e^{-x/u_o})} \quad (4)$$

This plot/track association network has been tested with simulation systems running on known processors. This network was implemented as a 3×3 network (i.e., 3 tracks and 3 plots) using connection weights as specified by equation (1) with coefficient values of A=B=D=5, C=2, n=4.5 (same ratios as taught by Hopfield). With a gain of $u_0$=0.02, no valid solutions were obtained, so it was greatly increased (gain was decreased) with values near 1.0 finally used. Having arrived at an appropriate value for n, valid solutions were obtained on problem instances of this size.

However, as the network's size increases (for example, 8 tracks and 8 plots) no set of system parameters that yielded stable solutions, valid or invalid, could be found. The literature suggests that network instability is a recognized problem. [See Wilson, G. V., Pawley, G. S.: "On the stability of the traveling salesman problem algorithm of Hopfield and Tank." Biol. Cybern. 58: 63–70 (1988)] Hopfield networks of this type frequently enter oscillatory, unstable states with alternating cycles of all units being "off" followed by all being "on."

An informal analysis of the instability reveals an imbalance between system excitation and inhibition. When there is too much inhibition, the activation values of all neurons are driven to near 0.0; the opposite happens when there is too little inhibition. If all neurons' activation values in one cycle are 0.0, then the majority of the inhibition (from one neuron to another) disappears, and the excitation (which is global and external) causes all neurons' values to go to 1.0 on the next cycle. Inhibition once again becomes great enough to overcome all excitation, and on the next cycle all values are again driven to 0.0.

With this imbalance as a cause of a neural networks' instability, a solution is needed to enhance network stability.

SUMMARY OF THE INVENTION

Briefly, in accordance with the invention, a "barometer" neuron for a neural network measures input values from the network neuron cells against a standard inhibition signal having a value equivalent to that of a "perfect" pair of neuron cells, and generates an excitation bias signal to the neural network to adjust the network to the desired standard level of inhibition which results in a balanced or stable neural network system.

Accordingly, one object of the invention is to provide a neural network having improved stability.

Another object of the invention is to provide a stabilizing means for a neural network.

Another object of the invention is to provide a neural network to enhance surveillance capabilities of low observable targets in a track-while-scan operation.

Another object of the invention is to provide a track-to-plot association network.

Another object of the invention is to provide a track-to-plot association network that minimizes global cost which is a function of the distances between plots in a given scan of data and the predicted track positions.

Further objects, features and the attending advantages of the invention will be apparent when the following description is read with the accompanying drawings.

DESCRIPTION OF THE PREFERRED EMBODIMENT

Figure 1:
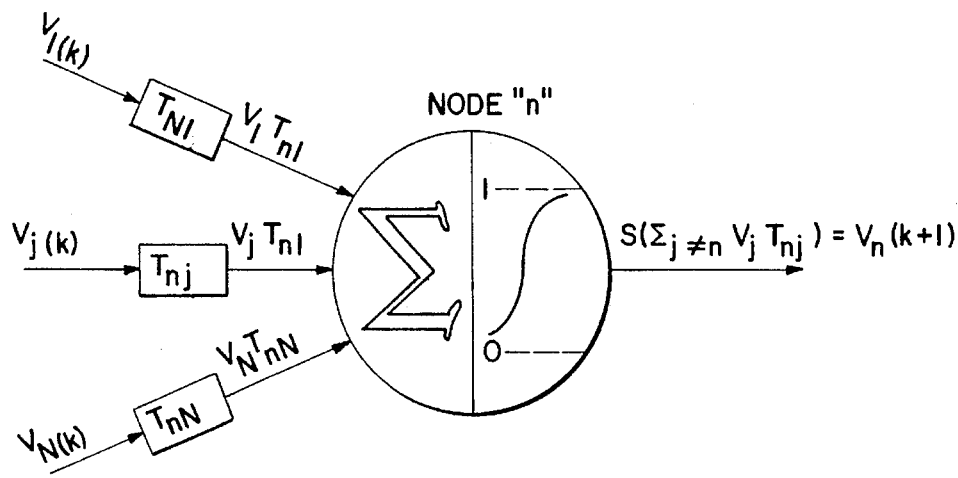
FIG. 1 is a PRIOR ART model of a processor used in the invention.
Figure 2:
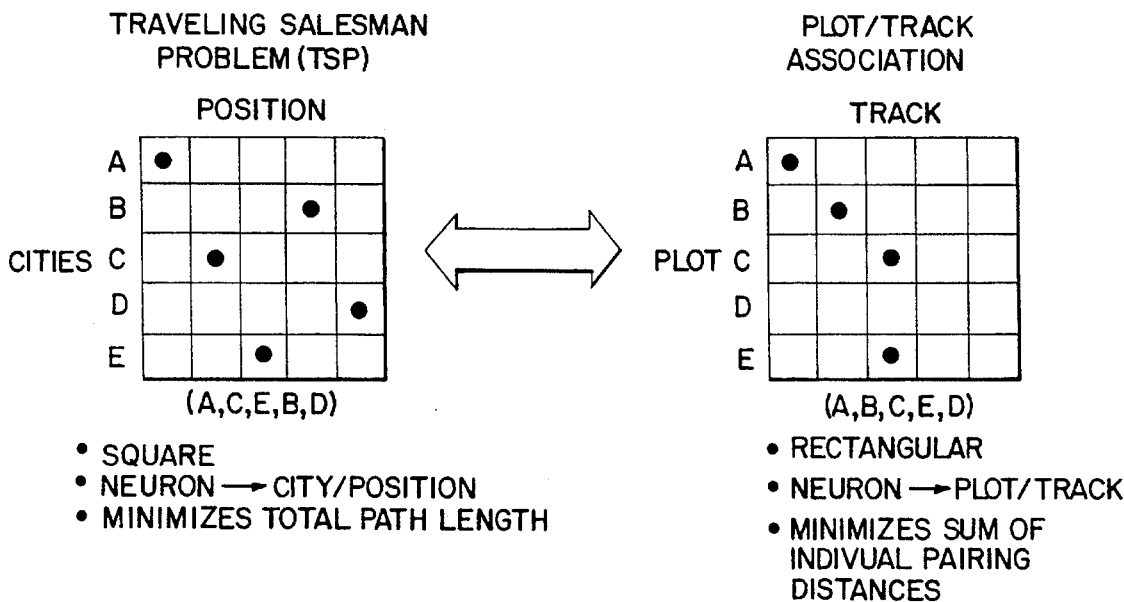
FIG. 2 is a graphical comparison of a PRIOR ART Hopfield Travelling Salesman Problem compared to a plot/track association as a basis for use in the invention.
Figure 3:
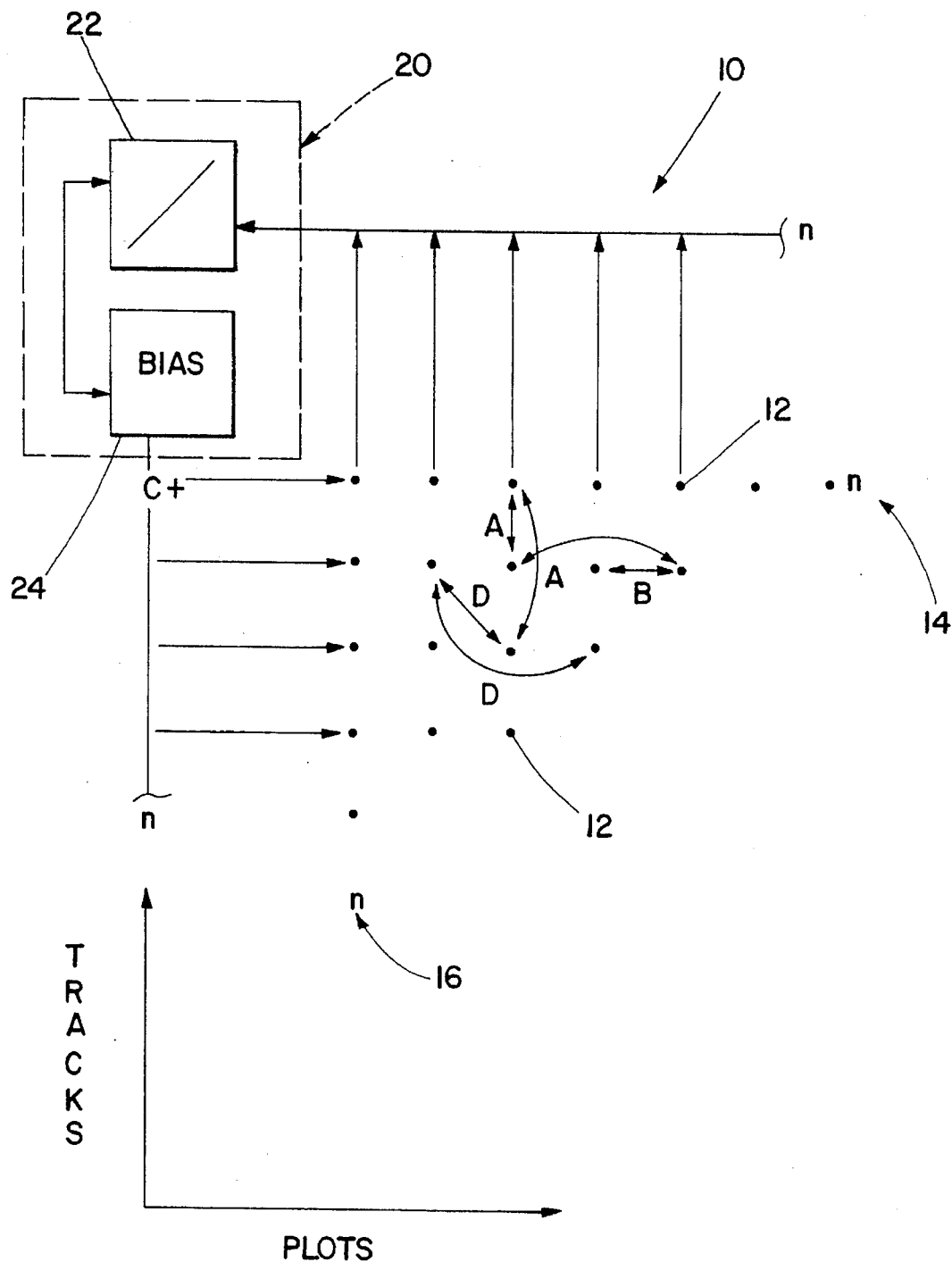
FIG. 3 is a schematic of the "barometer" neuron of the invention with a plot/track association network.

Referring to FIG. 3, a schematic representation of a neural network 10 has a plurality of cells or neurons 12 arranged in a rectangular grid (partly shown) with rows 14 and columns 16. If the rows 14 represent plots rather then cities (see Hopfield network, supra) and the columns are tracks rather than positions, the solution of plot/track association problems such as the problem shown by FIG. 4 can be interpreted in a similar way: there still should be only one cell "on" for each row 14, i.e., one association per plot, and one "on" for each column 16, i.e., one association per track. The solution state of the network 10 should have a number of cells 12 "on" corresponding to the minimum of these two counts.

Figure 4:
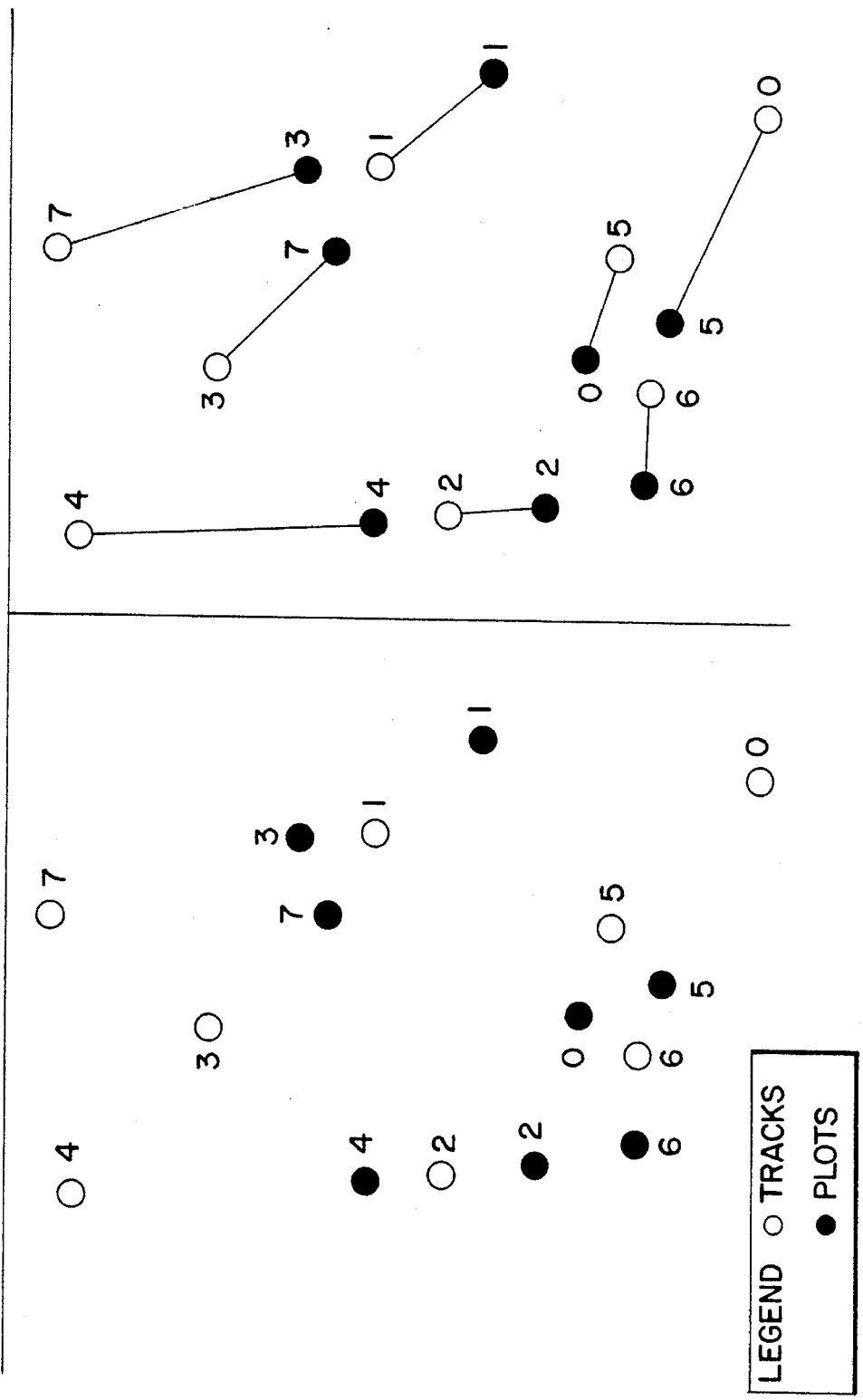
FIG. 4 is a graphical representation of one plot/track association problem and its solution as provided by the plot/track association network having the "barometer" neuron of the invention.

When the neural network of FIG. 3 is used for a solution to the plot/track association problem of FIG. 4, a distance measurement is also minimized for this problem: distance is measured from track-to-plot rather than city-to-city. The optimal solution to the plot/track association problem produces that set of assignments which, taken all together and obeying all the constraints, minimizes the sum of all of the distances from each plot to the predicted position of the track to which it is assigned. (See S. S. Blackman, "Multiple Target Tracking with Radar Applications", Artech House 1986.)

However, the pure Hopfield network when applied to the plot/track association problem of FIG. 4 becomes unstable and no stable solutions can be obtained as has been described above.

The desired stable solution for the plot/track association problem of FIG. 4, for example, can be obtained by the neural network 10 of FIG. 3 with the addition of a "barometer" neuron 20 to what would otherwise be considered a Hopfield network.

The "barometer" neuron 20 of FIG. 3 has two components: a summation component 22 that provides a feedback function and a dynamic bias component 24 that provides a broadcast function. The summation component 22 receives the global feedback input from the cells or neurons 12 that form the neural network 10, measures the network level of inhibition of the global feedback input against the inhibition level of a "perfect" pairing, i.e., a perfect pair of neurons having a total distance between a track and a plot equal to zero (the track and plot can be superimposed), and generates an output signal, either excitation or inhibition, to the dynamic bias component 24 of the neural network 10. This output signal adjusts the dynamic bias component to generate an excitation bias output signal (C+) to the neurons 12 that form the neural network. This excitation bias output signal (C+) is large enough to adjust the network so that a perfect pairing of weighted and summed input values drive its output value (the feedback from the neural network) to a value of 1.0, or nearly 1.0. This difference between the measured network level of inhibition to and the supplied excitation from the "barometer" neuron 20 of FIG. 3 can be designated the "desired input". However, less than perfect neurons in the neural network 10 will need more excitation so the "desired input" is generally stepped up so that these become "good" neurons, i.e., having a value of 1.0, or nearly 1.0.

Returning now to the difficult plot/track association problem of FIG. 4. It is difficult because many good pairings cannot be part of the best global solution. Pairing track 1 to plot 3, for example, would leave very poor pairings for plot 1 and track 7. The following table shows the coordinates of the plots and tracks used in this simulation; note that the origin is at upper left, and y coordinates increase downward:

| Plot | X | Y | Track | X | Y |
| --- | --- | --- | --- | --- | --- |
| 0 | 667.8 | 790.7 | 0 | 492.3 | 640.4 |
| 1 | 641.0 | 384.0 | 1 | 726.0 | 491.0 |
| 2 | 337.0 | 498.0 | 2 | 345.1 | 561.8 |
| 3 | 488.3 | 294.5 | 3 | 645.2 | 341.9 |
| 4 | 294.6 | 143.4 | 4 | 327.7 | 441.0 |
| 5 | 567.4 | 669.9 | 5 | 506.8 | 679.3 |
| 6 | 462.0 | 683.0 | 6 | 392.7 | 683.0 |
| 7 | 540.7 | 111.0 | 7 | 585.7 | 381.7 |

Figure 5:
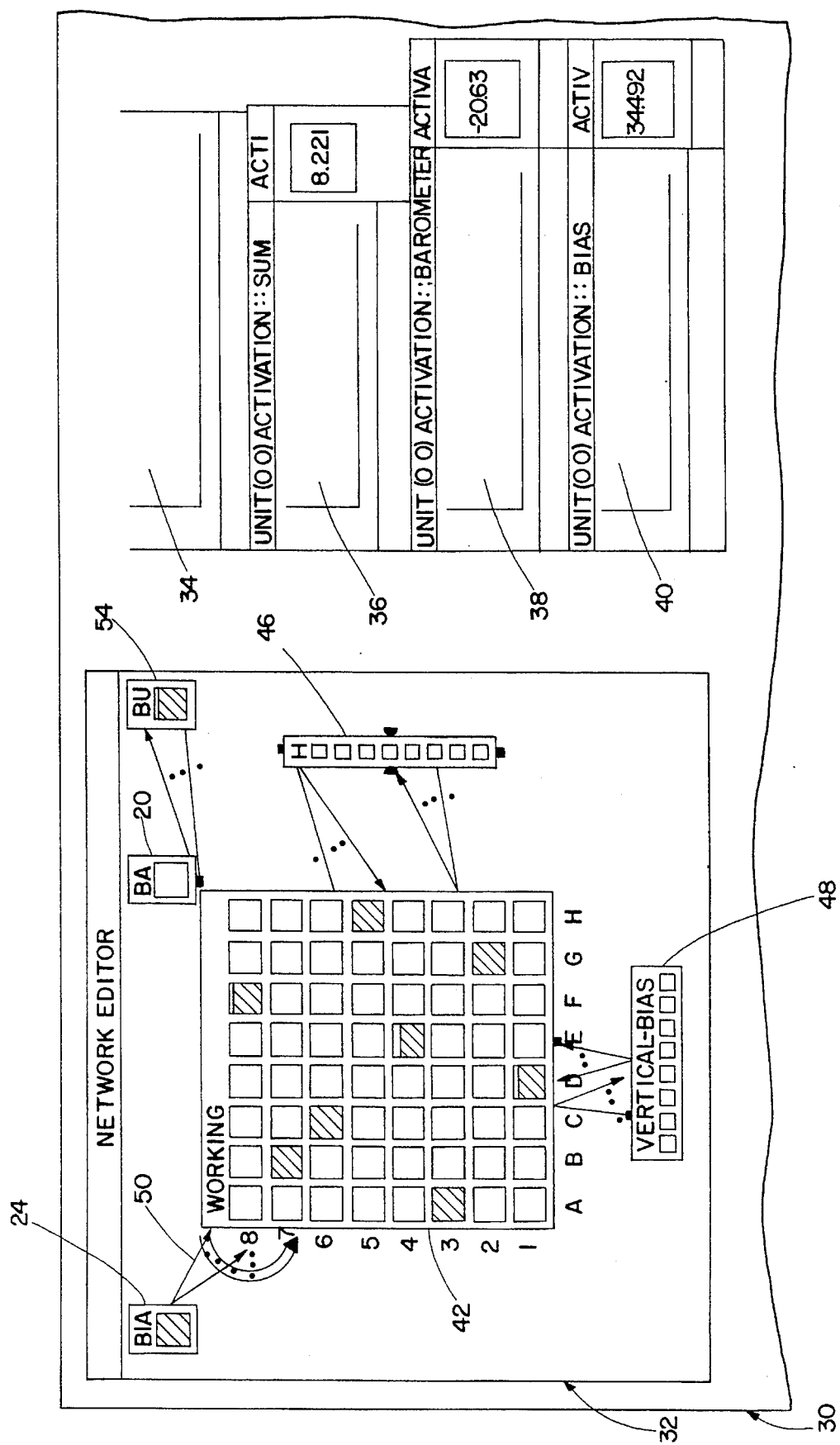
FIG. 5 is a hard copy of an initial monitor screen which represents implementation of the "barometer" neuron of the invention in operative use with a plot/track association network.

Implementation of the neural network 10 with the "barometer" neuron 20 of FIG. 3 in the solution of the plot/track association problem of FIG. 4 develops a series of display screens for each network cycle of the solution. The display screen 30 for the first in a series of twenty-six (26) network cycles is shown by FIG. 5. For purposes of description, only the network portion 32, and individual graph portions 34, 36, 38 and 40 of the display screen 30 which directly relate to the "barometer" neuron 20 need be considered here. The graph portions display the network's total energy, the sum of all the neuron's outputs for the network, the "barometer" neuron status, and the dynamic bias output, respectively.

Figure 6:
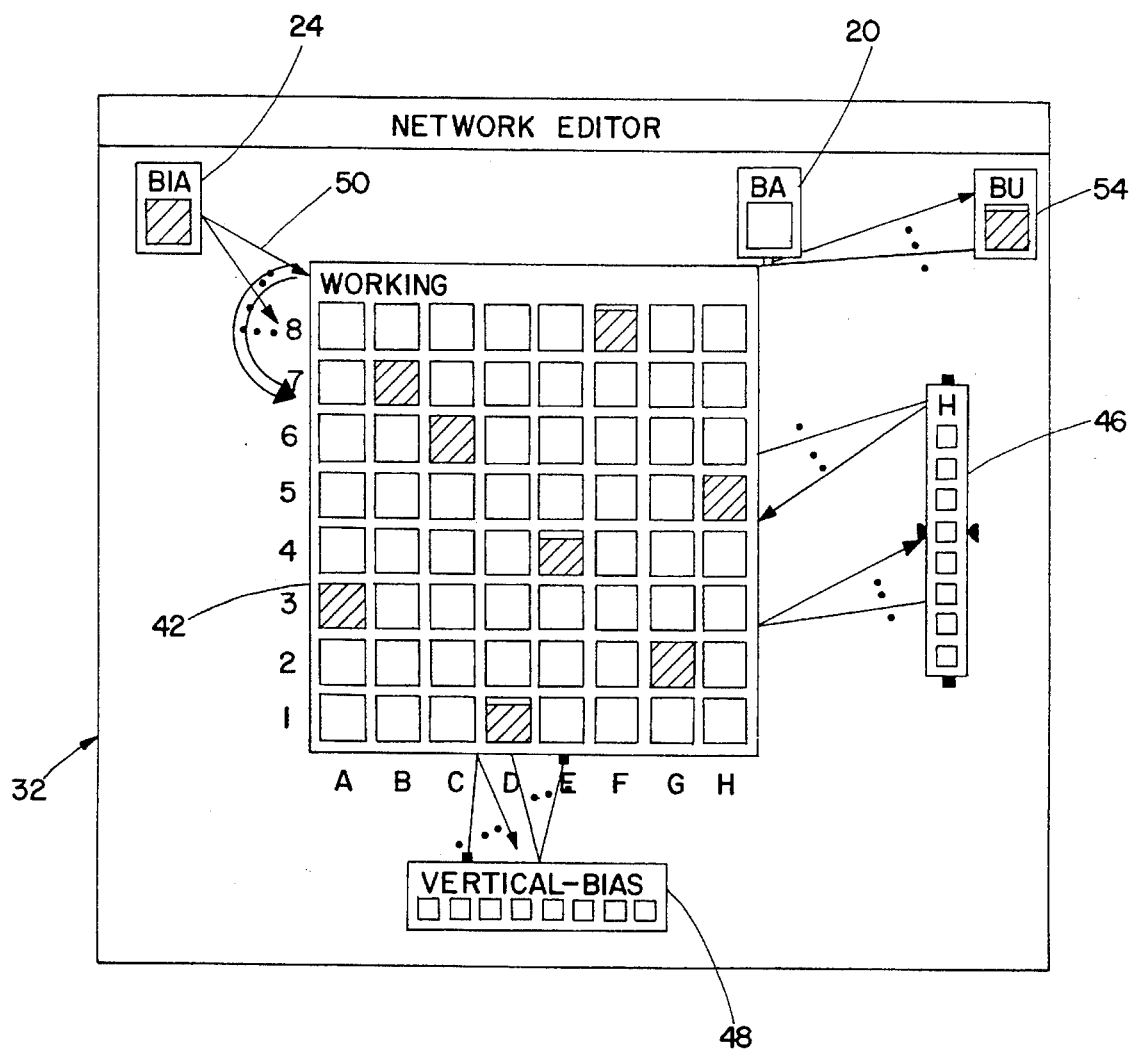
FIG. 6 is an enlargement of the hard copy of the monitor screen of FIG. 5 at Cycle 26 which shows the network editor portion of the screen and the "barometer" neuron of the invention.

Referring to FIG. 6, the last in the series of display screens like display screen 30 of FIG. 5 shows the neural network portion 32. The neural network processing or working of the plot/track association problem, as shown by FIG. 4 and the above table, has proceeded in cycles or stages from the network grid 42 in FIG. 5 where nearly every cell or neuron is "on", (completely black), to the network grid in FIG. 6 where only one cell is "on" in each row and column.

The evolution of the working condition of the network 42 from the first network cycle of FIG. 5 to the last network cycle of FIG. 6 reflects the effect of the "barometer" neuron 20 (symbolically shown by FIG. 6).

In addition to the "barometer" neuron 20, another form of network, like network 42, can have an added bias effect provided by separate horizontal (rows) and vertical (column) compensators 46 and 48, respectively. Each of these receives inputs row-by-row and column-by-column, computes the average row or column inhibitions value. These inhibition values may differ, indicating that the given row or column requires more or less additional excitation bias to remain stable. The compensators for each row and column enhance the network's overall stability by providing bias signals to stabilize individual rows and columns.

The symbolic "barometer" neuron 20 of FIG. 6 generates an output signal to the symbolic dynamic bias component 24 as has been described in conjunction with FIG. 3. The symbolic excitation bias output signal (C+) to the working network 42 is indicated by arrows 50. Lastly, for purposes of this description, a symbolic summation component 54 sums all of the network 42 inputs that reflect the total neuron's output for the network.

Figure 7:
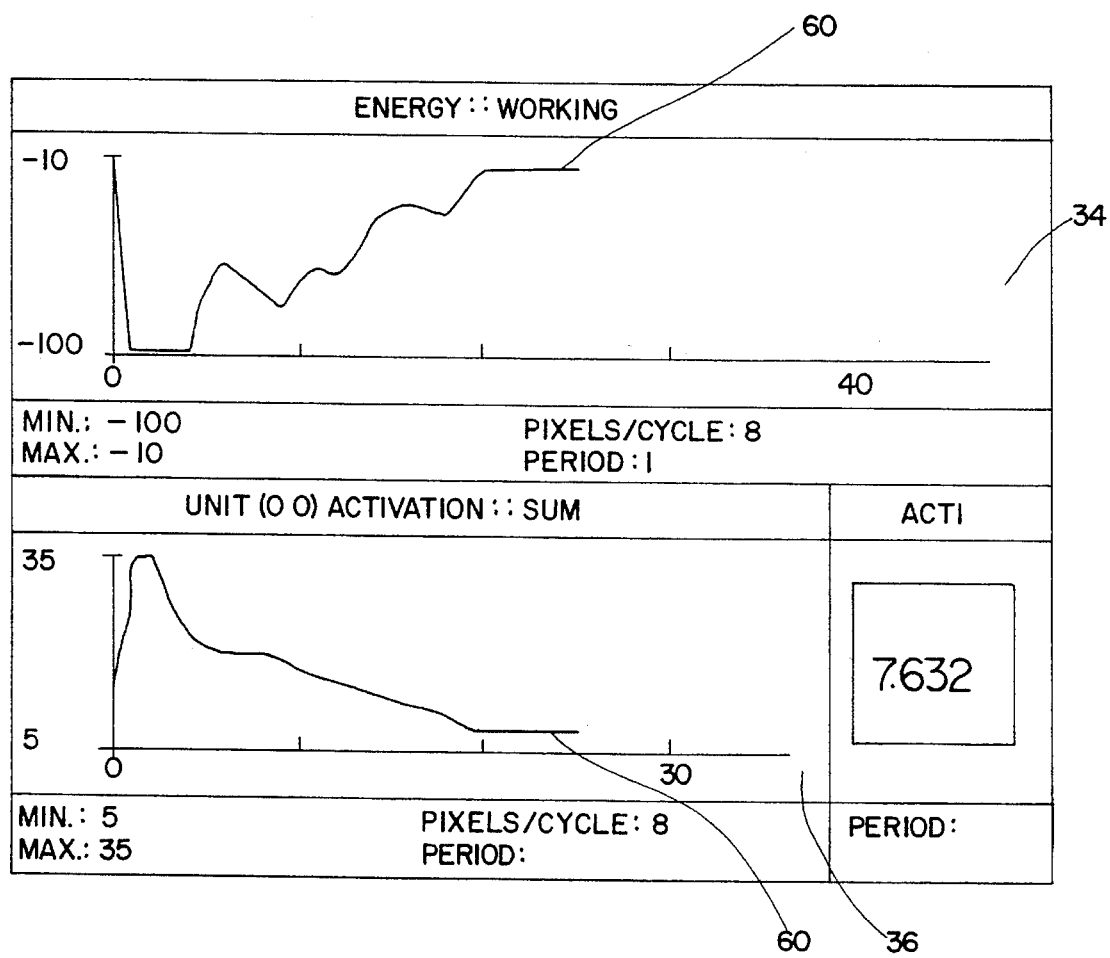
FIG. 7 is an enlargement of another portion of the screen of FIG. 5 with the graphical representations of the WORKING energy of the network, and a SUM of the output of all the neurons of the network.
Figure 8:
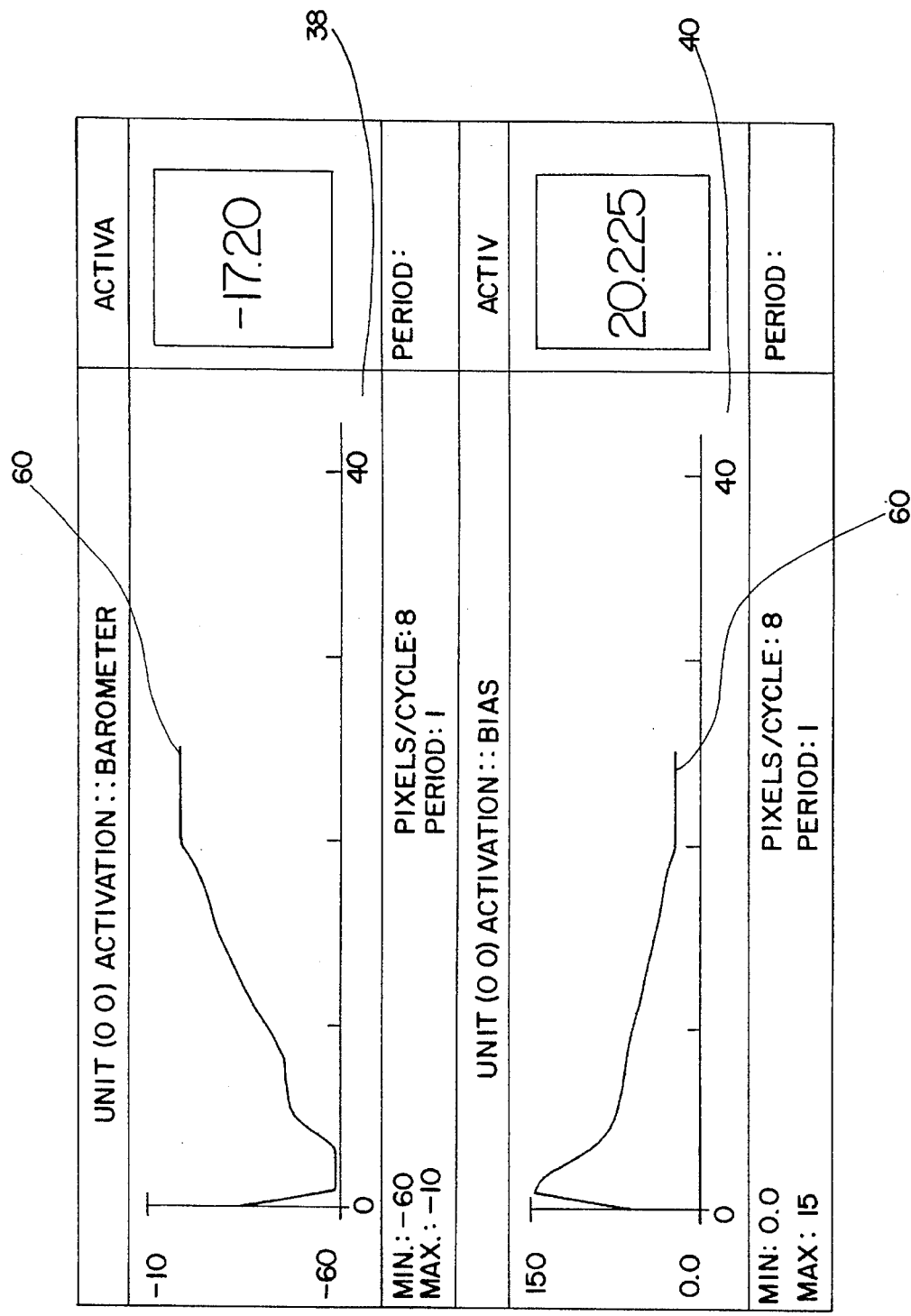
FIG. 8 is an enlargement of yet another portion of the screen of FIG. 5 with the graphical representations of the output of the BAROMETER neuron of the invention, and of the output of the dynamic BIAS source controlled by the "barometer" neuron of the invention.

Referring to FIGS. 7 and 8, the total energy of the working network 42 as a function of time is graphically represented at screen portion 34. Similarly, screen portion 36 is a graphical representation of the sum of all the neurons' outputs for the network; screen portion 38 is a graphical representation of the output signal from the "barometer" neuron 20 to the dynamic bias component 24; and, screen portion 40 is a graphical representation of the excitation bias output signal (C+) by the bias component 24 to the working network.

The "barometer" neuron 20 of FIG. 3 functions to stabilize the neural network 10 which is visualized symbolically by the graphical screen portions 34, 36, 38 and 40 of FIG. 5 and FIGS. 7 and 8. This stabilization effect which results from the "barometer" neuron 20 of the invention is shown in FIGS. 7 and 8 by the similar horizontal line segments 60 of the line graphs in each of the screen portions 34, 36, 38 and 40.

As will be evidenced from the foregoing description, certain aspects of the invention are not limited to the particular details of construction as illustrated, and it is contemplated that other modifications and applications will occur to os skilled in the art. It is, therefore, intended that the appended claims shall cover such modifications and applications that do not depart from the true spirit and scope of the invention.

We claim:

1. A "barometer" neuron for a track-while-scan neural network that has a plurality of interconnected neurons positioned in a row-and-column orientation where the neural network generates at least one input signal which represents an imbalance or instability between neural network excitation and inhibition, CHARACTERIZED IN THAT the "barometer" neuron comprises:

a) first means for generating a standard level of inhibition signal which represents the level of inhibition of a "perfect" pair of interconnected track and plot neurons having a total distance therebetween equal to zero, b) said first means for further measuring both the neural network input signal and said standard level of inhibition signal, and for generating a first output signal having a value that represents the difference in values between the neural network input signal and said standard level of inhibition signal, and c) second means for generating a second output signal having a value equal to the difference between said standard level of inhibition signal and said first output signal to adjust the neural network.

2. The "barometer" neuron of claim 1, wherein each neuron of said "perfect" pair of interconnected neurons is positioned in a separate row and column of the neural network.

\* \* \* \* \*